(12) United States Patent
Chiu et al.

(10) Patent No.: US 11,363,504 B2
(45) Date of Patent: Jun. 14, 2022

(54) BASE STATION AND HANDOVER CONTROL METHOD THEREOF

(71) Applicant: Sercomm Corporation, Taipei (TW)

(72) Inventors: Tzu-Che Chiu, Taipei (TW); Chang-Kuo Yeh, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 16/223,035

(22) Filed: Dec. 17, 2018

(65) Prior Publication Data

US 2020/0196206 A1 Jun. 18, 2020

(51) Int. Cl.
*H04W 36/00* (2009.01)

(52) U.S. Cl.
CPC ... *H04W 36/0069* (2018.08); *H04W 36/0033* (2013.01); *H04W 36/0072* (2013.01)

(58) Field of Classification Search
CPC ............ H04W 36/14; H04W 36/0069; H04W 36/0033; H04W 36/0072; H04W 36/0005; H04W 36/0007; H04W 36/38; Y02D 30/70
USPC ......................................................... 370/331
See application file for complete search history.

(56) References Cited

U.S. PATENT DOCUMENTS

| | | | | |
|---|---|---|---|---|
| 2014/0092866 A1* | 4/2014 | Teyeb | ............... | H04W 36/24 370/331 |
| 2016/0270139 A1* | 9/2016 | Rahman | ............ | H04W 72/0406 |
| 2017/0222876 A1* | 8/2017 | Van Der Velde | ... | H04W 12/041 |
| 2017/0289855 A1* | 10/2017 | Xu | ..................... | H04W 36/0016 |
| 2017/0318504 A1 | 11/2017 | Zhang et al. | | |
| 2018/0124612 A1* | 5/2018 | Babaei | ................. | H04W 16/14 |
| 2018/0199245 A1 | 7/2018 | Futaki et al. | | |

(Continued)

FOREIGN PATENT DOCUMENTS

| | | |
|---|---|---|
| CN | 104822169 | 8/2015 |
| CN | 105210416 | 12/2015 |
| CN | 105981440 | 9/2016 |

(Continued)

OTHER PUBLICATIONS

English Translation of CN 105981440 A, Ohta et al., Radio Communication Method, Radio Communication System, Base Station, And Radio Station, Sep. 28, 2016, Retrieved from PE2E Search on Feb. 1, 2021 (Year: 2016).*

(Continued)

*Primary Examiner* — Omar J Ghowrwal
(74) *Attorney, Agent, or Firm* — JCIPRNET

(57) ABSTRACT

A base station and a handover control method thereof are provided. The base station supports dual connectivity (DC) technology. The method includes the following steps. A handover request is transmitted, and a handover request response corresponding to the handover request is received. Whether the handover request response includes DC information is determined. In response to the handover request response not including the DC information, the DC information related to releasing a DC configuration is generated, and a handover command including the DC information is transmitted. The handover command corresponds to the handover request response. Accordingly, user equipment can be informed to release the DC configuration, so as to reduce power. In addition, a proper resource configuration would be provided.

10 Claims, 5 Drawing Sheets

(56) References Cited

U.S. PATENT DOCUMENTS

2019/0045402 A1* 2/2019 Nagasaka ............. H04W 36/28

FOREIGN PATENT DOCUMENTS

| CN | 107925931 | 4/2018 |
|---|---|---|
| EP | 2983407 | 2/2016 |
| TW | 201625032 | 7/2016 |
| WO | 2017170202 | 10/2017 |

OTHER PUBLICATIONS

English Translation of "Office Action of China Counterpart Application," dated Nov. 22, 2021, p. 1-p. 7, Retrieved from STIC on Feb. 1, 2021. (Year: 2021).*

English Translation of "Office Action of China Counterpart Application," dated Sep. 3, 2021, p. 1-p. 7, Retrieved from STIC on Feb. 1, 2021. (Year: 2021).*

"Office Action of Taiwan Counterpart Application," dated Aug. 27, 2019, p. 1-p. 6.

3GPP, "Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.

"Office Action of China Counterpart Application", dated Nov. 22, 2021, p. 1-p. 7.

ZTE, "Discussion on indicator in DC handover enhancement", 3GPP TSG-RAN WG3 #90, Nov. 16-20, 2015, pp. 1-2.

"Office Action of China Counterpart Application", dated Sep. 3, 2021, p. 1-p. 7.

* cited by examiner

BASE STATION AND HANDOVER CONTROL METHOD THEREOF

BACKGROUND

Technical Field

The disclosure relates to a handover technique, and particularly relates to a base station and a handover control method thereof.

Description of Related Art

FIG. 1 is a structural diagram of a conventional Dual Connectivity (DC) system 1. Referring to FIG. 1, the DC system 1 includes two base stations MBS and SBS and user equipment UE. The base station MBS is a master node, which is in charge of communicating with the user equipment UE and coordinates a radio resource used by the user equipment UE through an X2 interface with a secondary node (i.e. the base station SBS). A Radio Resource Control (RRC) signalling connection may only exist between the user equipment UE and the base station MBS, though data transmission may be implemented between the user equipment UE and the two base stations MBS and SBS. A purpose of the DC system 1 is to increase a data throughput of the user equipment UE through the base station SBS.

When the user equipment UE is handed over between the two base stations, a data service of the user equipment UE is required to be retained. FIG. 2 is an example of a conventional handover situation. Referring to FIG. 2, a source base station BSS is a base station where the user equipment UE is initially connected, and a target base station BST is a base station where the user equipment UE is intended to connect. When the user equipment UE is moved from a service coverage range of the source base station BSS to a service coverage range of the target base station BST, the user equipment UE may disconnect from the source base station BSS and establish a connection with the target base station BST. As for a context of the user equipment UE, if the X2 interface exists between the two base stations BSS and BST, the context is directly transmitted through the X2 interface, or transmitted through an S1 interface connected to a Mobile Management Entity (MME).

It should be noted that the DC technique probably encounters problems in the following situations. FIG. 3 is a signalling flowchart of conventional handover behavior. Referring to FIG. 3, it is assumed that the target base station BST is a conventional base station not supporting a DC function, and the user equipment UE is configured to execute the DC function with the source base station BSS and the secondary base station SBS. Moreover, in such situation, the context of the user equipment UE may be exchanged and transmitted through the X2 interface between the source base station BSS and the secondary base station SBS without using the S1 interface. When the source base station BSS decides a handover to the target base station BST, the source base station BSS transmits a handover request accompanied with the context of the user equipment UE (step S301). The target base station BST cannot learn a DC configuration of the user equipment UE, and cannot provide a DC-related configuration in a handover request acknowledge. After receiving the handover request acknowledge (step S302), the source base station BSS transmits a Secondary eNodeB (SeNB) release request or a Secondary gNodeB (SgNB) release request based on a type of the secondary base station SBS, so as to release a radio resource of the secondary base station SBS used by the user equipment UE. If the secondary base station SBS belongs to the gNB, it replies a SgNB release request acknowledge (step S304). On the other hand, the source base station BSS may directly transmit a handover command to the user equipment (step S305). After the user equipment UE is handed over to the target base station BST (step S306), the DC configuration of the user equipment UE still exists, and the user equipment UE may continuously monitor the secondary base station SBS. However, the target base station BST cannot connect the secondary base station SBS as the target base station BST does not support the DC function, such that the secondary base station SBS cannot continually communicate with the user equipment UE. Then, if the user equipment UE detects a connection failure with the secondary base station SBS, the user equipment UE requests the target base station BST to handle the connection failure. However, as the target base station BST does not support the DC function, the user equipment UE cannot acquire any response from the target base station BST. Such situation probably has two drawbacks, and a first drawback is that the user equipment UE wastes power to continuously monitor the secondary base station SBS, and a second drawback is that a resource configuration of the user equipment UE is inconsistent with that of the target base station BST. The inconsistent resource configuration results in the fact that the target base station BST probably transmits an improper resource configuration, which further influences a connection or data service with the user equipment UE.

SUMMARY

The disclosure is directed to a base station and a handover control method thereof, which are expected to resolve the drawbacks or problems mentioned above, so that a connection or data service between the base station and user equipment may be continued.

An embodiment of the disclosure provides a handover control method, adapted to a base station supporting a Dual Connectivity (DC) technology. The handover control method includes, but is not limited to, the following steps. A handover request is transmitted. A handover request response corresponding to the handover request is received. Whether the handover request response includes DC information is determined. In response to the handover request response not including the DC information, the DC information related to releasing a DC configuration is generated, and a handover command including the DC information is transmitted. The handover command corresponds to the handover request response.

An embodiment of the disclosure provides a base station, which supports a DC technology, and at least includes, but is not limited to, a transmitter, a receiver and a processor. The transmitter is configured to transmit a signal. The receiver is configured to receive the signal. The processor is coupled to the transmitter and the receiver, and is configured to execute following steps. A handover request is transmitted by the transmitter. A handover request response corresponding to the handover request is received by the receiver. Whether the handover request response includes DC information is determined. In response to the handover request response not including the DC information, the DC information related to releasing a DC configuration is generated, and a handover command including the DC information is transmitted by the transmitter, where the handover command corresponds to the handover request response.

Based on the above description, in the base station and the handover control method thereof of the embodiment of the disclosure, whether the target base station supports the DC function is determined through information in the handover request acknowledge. In response to the target base station not supporting the DC function, the source base station actively generates the DC information related to releasing the DC configuration, and transmits the DC information to the user equipment, and the user equipment accordingly stops/disables/releases the DC function. In this way, the user equipment is unnecessary to waste power to continuously monitor the secondary base station, and data transmission and service between the user equipment and the target base station will not be interrupted abnormally.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
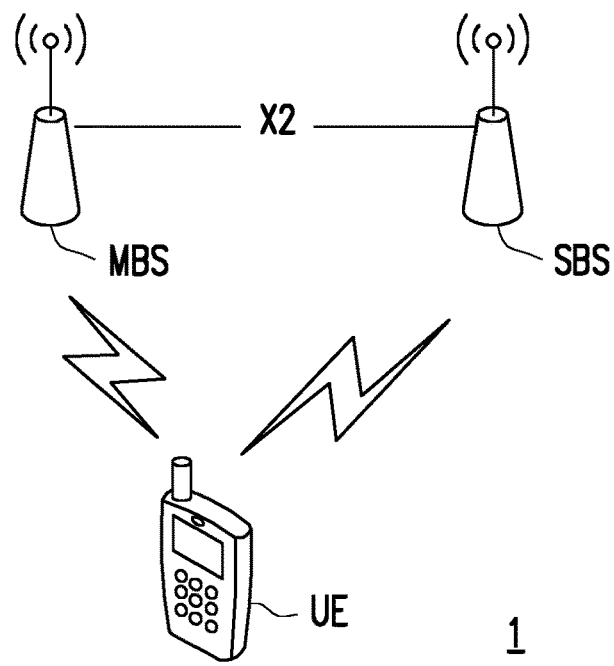
FIG. 1 is a structural diagram of a conventional Dual Connectivity (DC) system.
Figure 2:
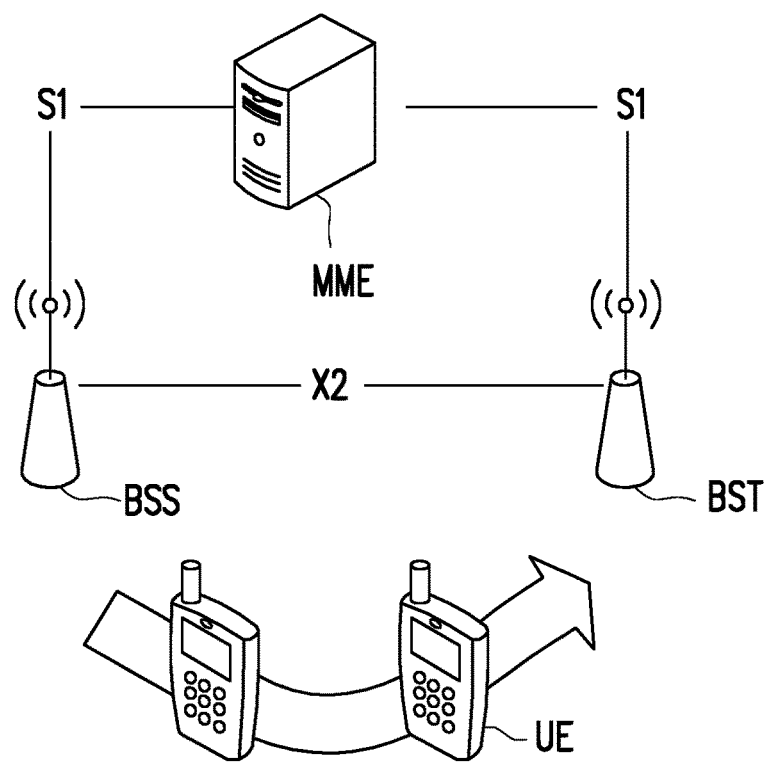
FIG. 2 is an example of a conventional handover situation.
Figure 3:
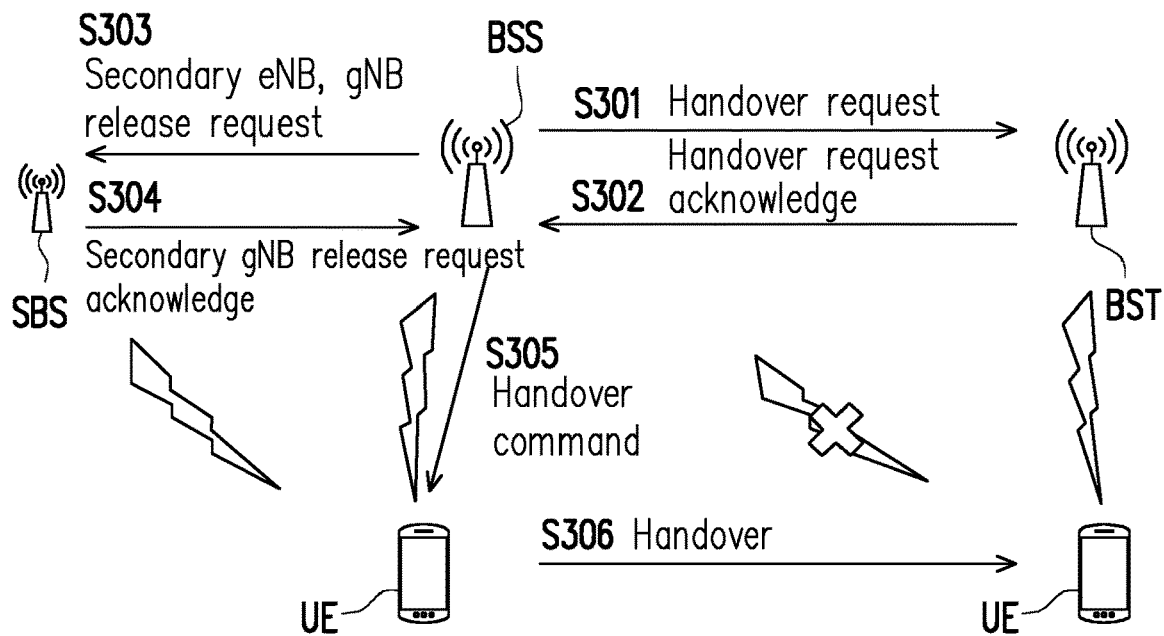
FIG. 3 is a signalling flowchart of conventional handover behavior.
Figure 4:
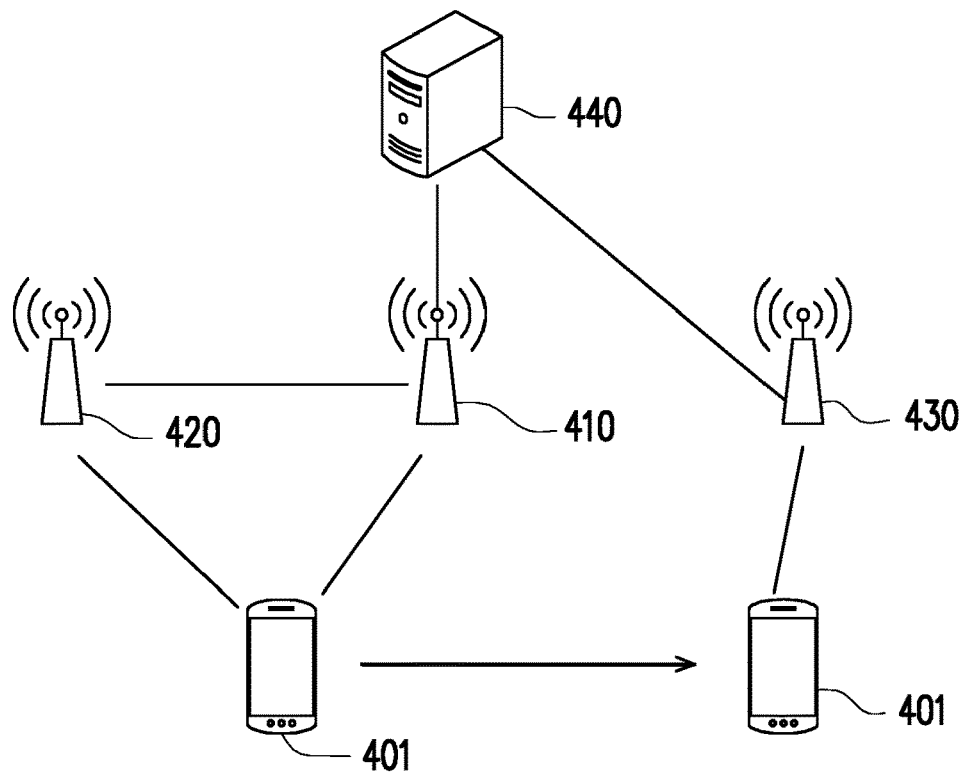
FIG. 4 is a schematic diagram of a communication system according to an embodiment of the disclosure.

FIG. 4 is a schematic diagram of a communication system 4 according to an embodiment of the disclosure. Referring to FIG. 4, the communication system 4 at least includes, but is not limited to, user equipment 401, a source base station 410, a secondary base station 420, a target base station 430 and a mobile management entity (MME) 440. It should be noted that the number of the devices and a position of each device in the communication system 4 are only an example, which may be changed by those skilled in the art according to an actual requirement.

The user equipment 401 may have multiple implementations, for example, (but is not limited to) a mobile station, an Advanced Mobile Station (AMS), a telephone device, a Customer Premise Equipment (CPE), a wireless sensor, etc.

The source base station 410 may have multiple implementations, for example, (but is not limited to) a Home Evolved Node B (HeNB), an eNB, a gNodeB (gNB), and Advanced Base station (ABS), a Base Transceiver System (BTS), a relay, a repeater, and/or a satellite-based communication base station.

Figure 5:
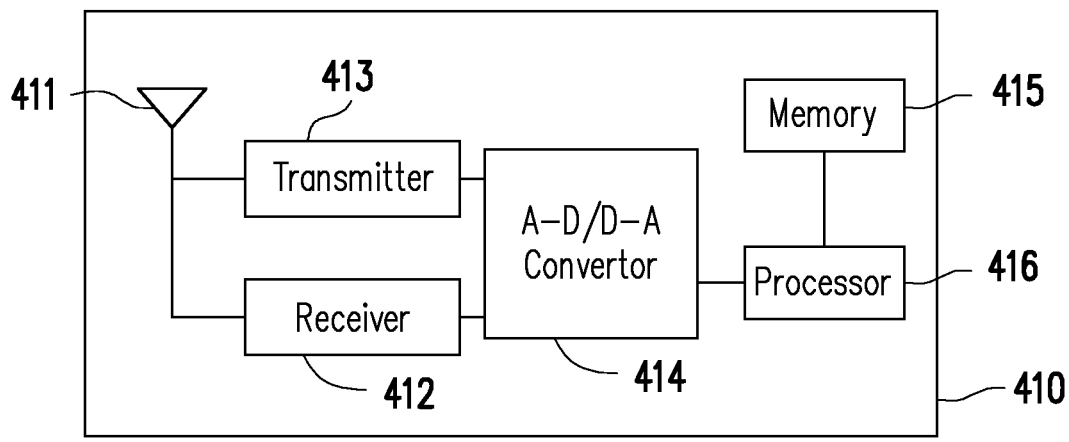
FIG. 5 is a device block diagram of a source base station according to an embodiment of the disclosure.

FIG. 5 is a device block diagram of the source base station 410 according to an embodiment of the disclosure. Referring to FIG. 5, the source base station 410 may at least include (but is not limited to) one or more antennas 411, a receiver 412, a transmitter 413, an Analog-to-Digital (A-to-D)/Digital-to-Analog (D-to-A) Converter 414, a memory 415 and a processor 416.

The receiver 412 and the transmitter 413 are respectively configured to receive uplink signals and downlink signals through the antenna 411 in a wireless manner. The receiver 412 and the transmitter 413 may also execute analog signal processing operations such as low-noise amplifying, impedance matching, frequency mixing, frequency up-converting or frequency down-converting, filtering, amplifying and other similar operations. The A-to-D/D-to-A converter 414 is configured to convert a signal from an analog signal format to a digital signal format during an uplink signal processing period and convert a signal from the digital signal format to the analog signal format during a downlink signal processing period.

The memory 415 may be any type of a fixed or movable Random Access Memory (RAM), a Read-Only Memory (ROM), a flash memory or a similar device or a combination of the above devices. The memory 415 records program codes, device configurations, codebooks, buffer data or permanent data, and records other various communication protocol-related soft modules such as a Radio Resource Control (RRC) layer, a Media Access Control (MAC) layer, a physical layer, etc.

The processor 416 is configured to process digital signals, and executes a procedure of the exemplary embodiment of the disclosure, and is adapted to access or load the data and software modules recorded by the memory 415. Functions of the processor 416 may be implemented by using a programmable unit such as a Central Processing Unit (CPU), a microprocessor, a microcontroller, a Digital Signal Processing (DSP) chip, a Field Programmable Gate Array (FPGA), etc. The functions of the processor 416 may also be implemented by an independent electronic device or an Integrated Circuit (IC), and operations of the processor 416 may also be implemented by software.

An implementation of the secondary base station 420 and components thereof may refer to the related description of the source base station 410, and detail thereof is not repeated. It should be noted that in the embodiment, the source base station 410 and the secondary base station 420 support a Dual Connectivity (DC) function. The source base station 410 serves as a master node, and the secondary base station 420 serves as a secondary node. When the source base station 410 and the secondary base station 420 serve the user equipment 401 through the DC function, control signalling is transmitted between the source base station 410 and the user equipment 401, and data may be transmitted between the source base station 410 and the user equipment 401 or between the secondary base station 420 and the user equipment 401.

An implementation of the target base station 430 and components thereof may refer to the related description of the source base station 410, and detail thereof is not repeated. It should be noted that in the embodiment, the target base station 430 does not support the DC function. Namely, the target base station 430 cannot serve the user equipment 401 at the same time with the secondary base station 420 or other base stations, and can only provide services alone.

The MME 440 may have multiple implementations, for example (but is not limited to), a server, a computer host, a work station, etc. The MME 440 may be connected to the source base station 410 and the target base station 430 through an S1 interface, and is configured to manage a position, related data or the handover behavior of the user equipment 401.

In order to facilitate understanding of an operation flow of the embodiment of the disclosure, multiple embodiments is provided below to describe an operation flow of the communication system 4 of the embodiment of the disclosure in detail. In the following content, the method of the embodiment of the disclosure is described with reference of various devices in the communication system 4. Various steps of the method of the embodiment of the disclosure may be adjusted according to an actual implementation, and are not limited by the disclosure.

Figure 6:
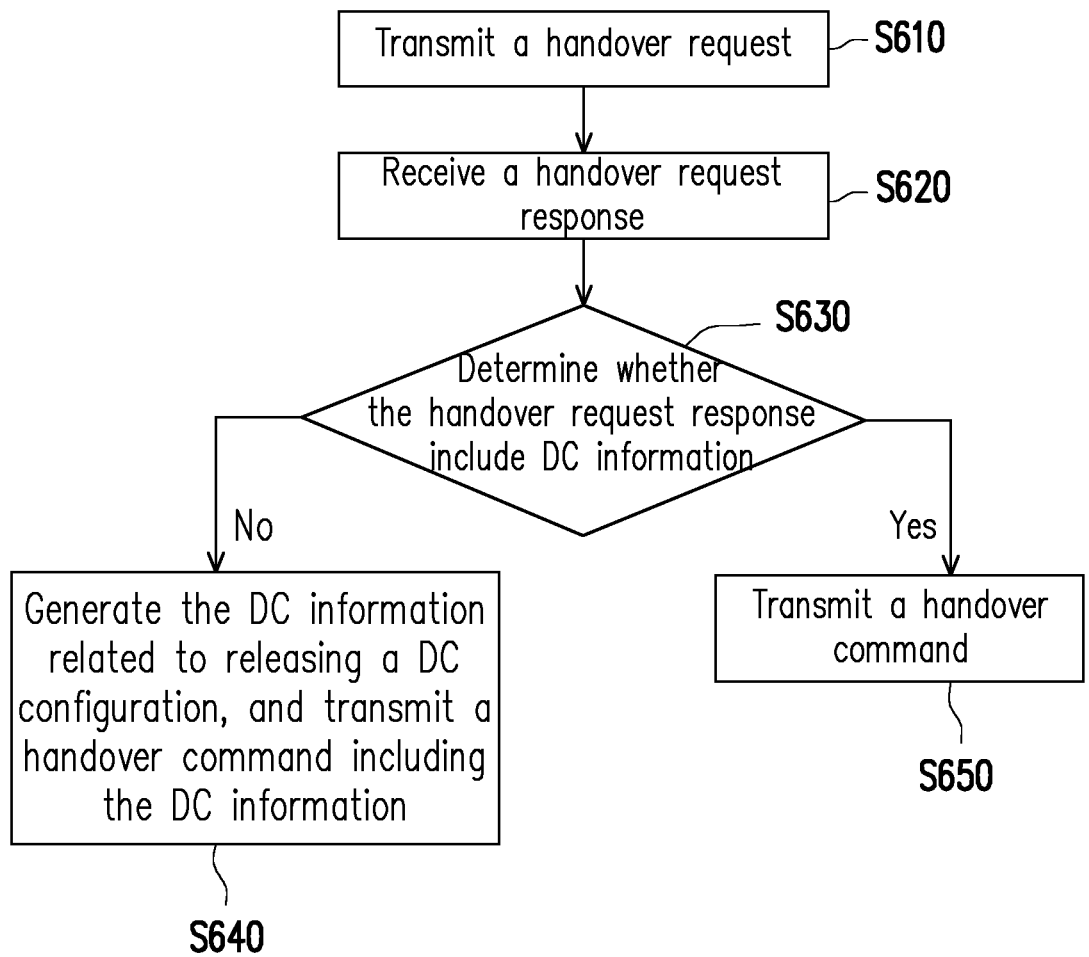
FIG. 6 is a flowchart illustrating a handover control method according to an embodiment of the disclosure.

FIG. 6 is a flowchart illustrating a handover control method according to an embodiment of the disclosure. Referring to FIG. 4 and FIG. 6, it is assumed that the user equipment 401 is simultaneously served by the source base station 410 and the secondary base station 420 through the DC function. When the user equipment 401 is moved to the target base station 430, the source base station 410 decides to hand over the user equipment 401 to the target base station 430 (for example, a determination mechanism such as a received signal strength of the target base station 430 is greater than a received signal strength of the source base station 410, etc.). The processor 416 of the source base station 410 transmits a handover request through the transmitter 413 (step S610). If the handover is based on an X2 interface, the handover request may be a HANDOVER REQUEST message defined by 3GPP TS 36.423, and is transmitted to the target base station 430. If the handover is based on the S1 interface, the handover request may be a HANDOVER REQUIRED message defined by 3GPP TS 36.413, and is transmitted to the MME 440.

Then, the processor 416 of the source base station 410 receives a handover request response corresponding to the handover request transmitted in the step S610 from the target base station 430 or the MME 440 through the receiver 412 (step S620). If the handover is based on an X2 interface, the handover request response may be a HANDOVER REQUEST ACKNOWLEDGE message (which may include a handover command) defined by 3GPP TS 36.423, and is received from the target base station 430. If the handover is based on the S1 interface, the handover request response may be a HANDOVER COMMAND message defined by 3GPP TS 36.413, and is received from the MME 440.

The processor 416 of the source base station 410 determines whether the handover request response received in the step S620 includes DC information (step S630). To be specific, information elements (IEs) such as a fullConfig-r9, a Secondary Cell Group (SCG)-configuration-r12, and a new radio (nr)-Config-r15, and/or user equipment (UE) context kept indicator, etc., are all DC information used for determining whether to release a DC configuration by the source base station 410. For example, the UE context kept indicator is a secondary node context (related to a resource of the secondary base station 420 and other settings) used for determining whether the target base station 430 supports the DC function and whether to keep the user equipment 401 by the source base station 410. The processor 416 may determine whether the handover command in the handover request response has the fullConfig-r9 IE, the SCG-Configuration-r12 IE or the nr-Config-r15 IE, whether the handover request response has a user equipment kept indicator IE, and/or whether the information elements have values, so as to determine whether the DC information is included.

In response to the handover request response not including the DC information (for example, the user equipment context kept indicator, the fullConfig-r9, the SCG-Configuration-r12, the nr-Config-r15 or other DC information) (or these information elements do not have values), the processor 416 of the source base station 410 generates DC information related to releasing the DC configuration, and transmits a handover command including the generated DC information through the transmitter 413 (step S650). In the embodiment, the processor 416 may set a choice field in the DC information such as the SCG-Configuration-r12 IE or the nr-Config-r15 IE, etc., to "release" (based on a type of the secondary base station 420 (for example, SeNB or SgNB), only a specific information element is probably used, for example, SeNB corresponds to the SCG-Configuration-r12, and SgNB corresponds to the nr-Config-r15). The processor 416 may add the DC information related to releasing the DC configuration to the handover command, and transmits the handover command to the user equipment 401 through the transmitter 413, such that the user equipment 401 may stop using or disable the DC function according to the DC information generated by the source base station 410. In other words, the processor 416 of the source base station 410 of the embodiment of the disclosure may modify the handover command transmitted to the user equipment 401, so as to take the initiative in prompting the user equipment 401 to release the DC configuration with the source base station 410 and the secondary base station 420.

On the other hand, it is assumed that in other embodiments, the target base station 430 supports the DC function, such that the handover request response received by the source bases station 410 from the target base station 430 or the MME 440 has the aforementioned DC information. The processor 416 of the source base station 410 may directly transmit the handover command (including the DC information) coming from the target base station 430 to the user equipment 401 (step S640) through the transmitter 413 (step S640) without generating the DC information by itself or modifying the handover command.

In order to fully convey the spirit of the disclosure to those skilled in the art, two other embodiments are provided below for further descriptions.

Figure 7:
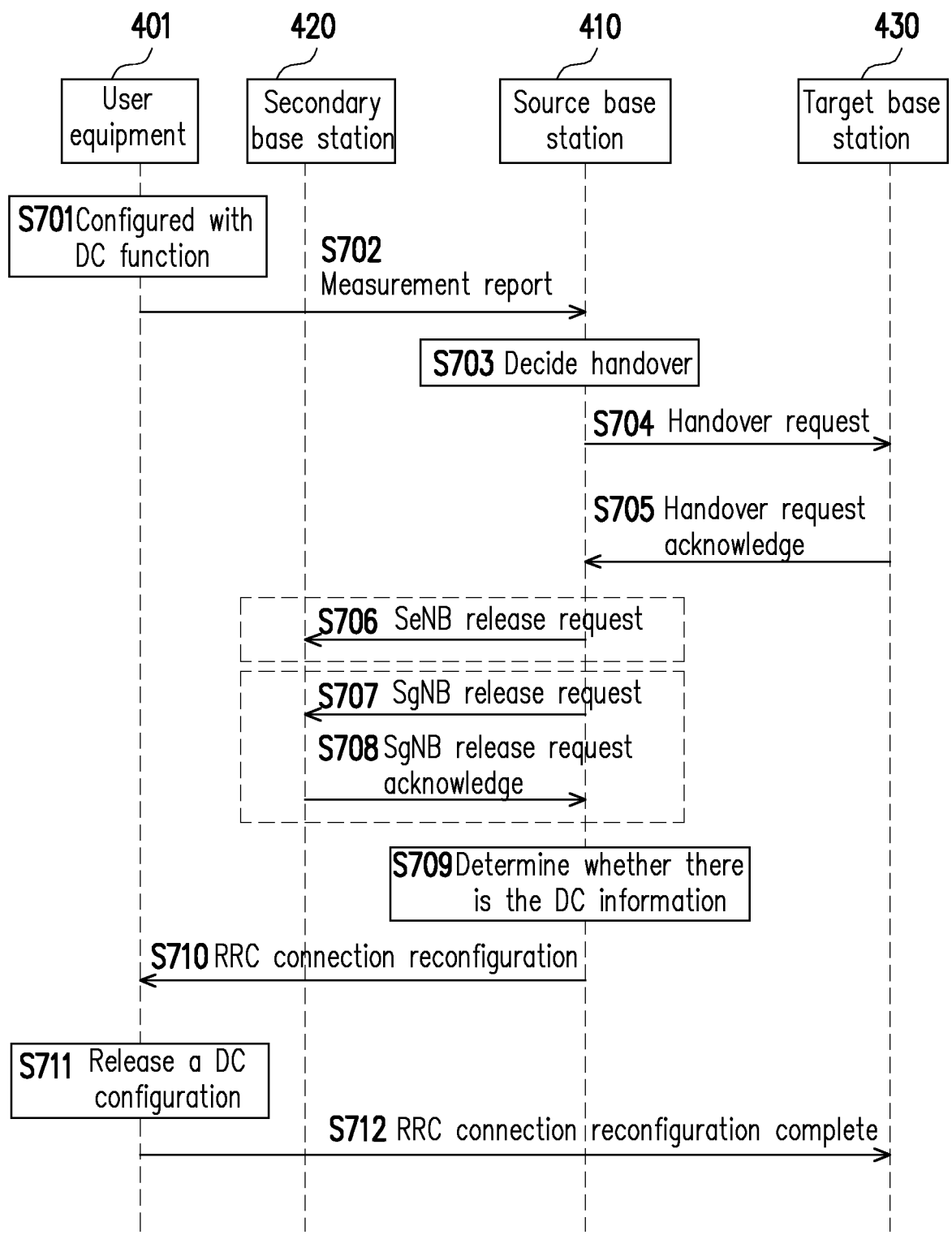
FIG. 7 is a signalling flowchart of X2 interface handover according to an embodiment of the disclosure.

FIG. 7 is a signalling flowchart of X2 interface handover according to an embodiment of the disclosure. Referring to FIG. 7, the handover behavior of the embodiment is based on the X2 interface. The user equipment 401 is configured to have the DC function (step S701), and is adapted to connect the source base station 410 and the secondary base station 420. The user equipment 401 continuously transmits a measurement report (for example, information such as a related signal strength, signal quality, etc.) to the source base station 410 (step S702). Then, the source base station 410 decides to hand over the user equipment 401 to the target base station 430 according to the measurement report (step S703), and transmits a handover request message to the target base station 430 (step S704). The target base station 430 does not support the DC function, so that a handover request acknowledge message transmitted to the source base station 410 by the target base station 430 does not include the user equipment context kept indicator IE, and the handover command message in the handover request acknowledge message does not include the information element such as the fullConfig-r9 IE, the SCG-Configuration-r12 IE or the nr-Config-r15 IE (step S705).

If the secondary base station 420 is an eNB, the source base station 410 transmits a secondary eNB (SeNB) release request message (step S706). If the secondary base station 420 is a gNB, a secondary gNB (SgNB) release request is transmitted (step S707), and the secondary base station 420 transmits a SgNB release request acknowledge message (step S708). On the other hand, the source base station 410 determines whether the handover request acknowledge message has the user equipment context kept indicator IE and whether the handover command in the handover request acknowledge message has the DC information of the information element such as the fullConfig-r9 IE, the SCG-Configuration-r12 IE or the nr-Config-r15 IE (step S709).

Since the target base station 430 of the embodiment does not support the DC function, the source base station 410 generates the corresponding DC information (for example, the SCG-Configuration-r12 IE or the nr-Config-r15 IE, etc.) based on the type of the secondary base station 420 (eNB or gNB), and adds the generated DC information (related to releasing the DC configuration) to the handover command message. The source base station 410 transmits the above modified handover command message to the user equipment 401 through a RRC connection reconfiguration message (step S710). In this way, the user equipment 401 releases the DC configuration according to the modified handover command message (step S711), and now the user equipment 401 is not configured with the DC function and does not continually monitor packets of the secondary base station 420. The user equipment 401 then transmits back a RRC connection reconfiguration complete message to the target base station 430 (step S712).

Figure 8:
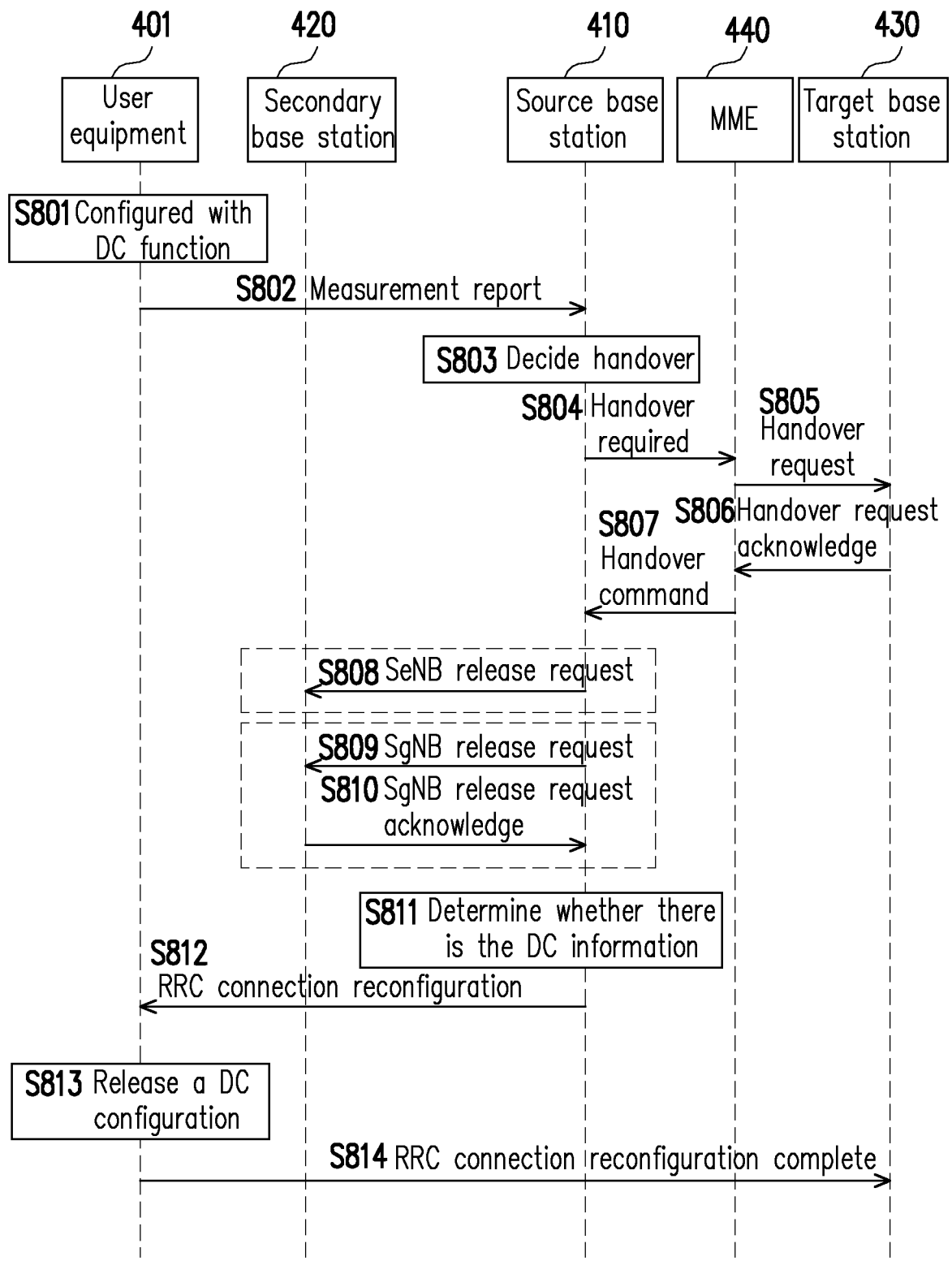
FIG. 8 is a signalling flowchart of S1 interface handover according to an embodiment of the disclosure.

FIG. 8 is a signalling flowchart of S1 interface handover according to an embodiment of the disclosure. Referring to FIG. 8, the handover behavior of the embodiment is based on the S1 interface. Steps S801, S802, S803, S808-S813 and S814 may refer to related descriptions of the steps S701, S702, S703 and S706-S712, and details thereof are not repeated. A difference between the present embodiment and the embodiment of FIG. 7 is that the source base station 410 and the target base station 430 of FIG. 8 cannot transmit information through the X2 interface, so that the source base station 410 transmits handover required message to the MME 440 (step S804), and the MME 440 transmits a handover request message to the target base station 730 (step S805). The target base station 730 transmits back a handover request acknowledge message (no information element of the fullConfig-r9 IE, the SCG-Configuration-r12 IE or the nr-Config-r15 IE since the DC function is not supported) to the MME 440 (step S806). The MME 440 transmits the handover command message in the handover request acknowledge message to the source base station 410 (step S807). Moreover, in step S811, the source base station 410 is only required to determine whether the handover command message coming from the MME 440 has the DC information of the information element such as the fullConfig-r9 IE, the SCG-Configuration-r12 IE or the nr-Config-r15 IE, etc. If there is not DC information, the source base station 410 directly transmits the modified handover command message (including the DC information related to releasing the DC configuration) to the user equipment 401 through the RRC connection reconfiguration message (step S812), such that the user equipment 401 may also release the DC function with the secondary base station 420 (step S813).

In summary, in the base station and the handover control method thereof of the embodiment of the disclosure, in response to the target base station not supporting the DC function, by modifying the handover command transmitted to the user equipment, the user equipment may accordingly release the DC configuration. In this way, the user equipment no longer continually monitors packets coming from the secondary base station, so as to save power. Moreover, the target base station is unnecessary to worry about resource configuration confliction, and may provide a proper resource configuration to the user equipment and maintain data transmission and services.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A handover control method, adapted to a base station supporting a dual connectivity (DC) technology with a secondary base station, wherein a user equipment (UE) is simultaneously connected to the base station and the secondary base station, and the handover control method comprising:
    transmitting a handover request;
    receiving a handover request response, wherein the handover request response corresponds to the handover request;
    making a decision that a UE context kept indicator information element (IE) is missing in the handover request response, wherein the UE context kept indicator IE is used for determining whether a target base station supports the DC technology and whether to keep the UE by the base station; and
    in response to the decision, modifying a handover command by generating new DC information related to releasing a DC configuration on the UE, and transmitting the handover command comprising the new DC information, wherein the handover command corresponds to the handover request response, and the new DC information indicates that the target base station which sends the handover request response does not support the DC technology, wherein the target base station cannot connect to the UE and the secondary base station simultaneously.

2. The handover control method as claimed in claim 1, wherein DC information comprises at least one of a full-Config-r9 information element (IE), a Secondary cell group (SCG)-Configuration-r12 IE, and a New Radio (NR)-Config-r15 (nr-Config-r15) IE, and handover control method further comprises:
    determining whether the DC information is missing in the handover request response.

3. The handover control method as claimed in claim 2, wherein the handover request response comprises the handover command, and the step of determining whether the handover request response comprises the DC information comprises:
    determining whether the handover command in the handover request response comprises the fullConfig-r9 IE, the SCG-Configuration-r12 IE, or the nr-Config-r15 IE, or determining whether the IE has value, so as to determine whether the DC information is included.

4. The handover control method as claimed in claim 2, wherein the step of generating the new DC information related to releasing the DC configuration comprises:
    setting a choice field in the SCG-Configuration-r12 IE or the nr-Config-r15 IE to release.

5. The handover control method as claimed in claim 1, further comprising:
    transmitting another handover request;

receiving another handover request response which corresponds to the another handover request and comprises the UE context kept indicator IE; and in response to the another handover request response comprising the UE context kept indicator IE, transmitting to the UE to be handed over another handover command which comprises the UE context kept indicator IE.

6. A base station, supporting a dual connectivity (DC) technology with a secondary base station, wherein a user equipment (UE) is simultaneously connected to the base station and the secondary base station, and the base station comprising:
a transmitter, configured to transmit signals;
a receiver, configured to receive signals;
a processor, coupled to the transmitter and the receiver, and configured to execute:
transmitting a handover request by the transmitter;
receiving a handover request response by the receiver, wherein the handover request response corresponds to the handover request;
making a decision that a UE context kept indicator information element (IE) is missing in the handover request response, wherein the UE context kept indicator IE is used for determining whether a target base station supports the DC technology and whether to keep the UE by the base station; and
in response to the decision, modifying a handover command by generating new DC information related to releasing a DC configuration on the UE, and transmitting the handover command comprising the new DC information by the transmitter, wherein the handover command corresponds to the handover request response, and the new DC information indicates that the target base station which sends the handover request response does not support the DC technology, wherein the target base station cannot connect to the UE and the secondary base station simultaneously.

7. The base station as claimed in claim 6, wherein DC information comprises at least one of a fullConfig-r9 IE, a SCG-Configuration-r12 IE, and a nr-Config-r15 IE, and the processor is configured to execute:
determining whether the DC information is missing in the handover request response.

8. The base station as claimed in claim 7, wherein the handover request response comprises the handover command, and the processor is configured to execute:
determining whether the handover command in the handover request response comprises the fullConfig-r9 IE, the SCG-Configuration-r12 IE, or the nr-Config-r15 IE, or determining whether the IE has value, so as to determine whether the DC information is included.

9. The base station as claimed in claim 7, wherein the processor is configured to execute:
setting a choice field in the SCG-Configuration-r12 IE or the nr-Config-r15 IE to release.

10. The base station as claimed in claim 6, wherein the processor is further configured to execute:
transmitting, by transmitter, another handover request;
receiving, by the receiver, another handover request response which corresponds to the another handover request and comprises the UE context kept indicator IE; and
in response to the another handover request response comprising the UE context kept indicator IE, transmitting, by the transmitter to the UE to be handed over, another handover command which comprises the UE context kept indicator IE.

* * * * *